June 28, 1949. H. P. CARRIER 2,474,222
SPLIT RING RETAINER EXTRACTOR
Filed May 15, 1945

INVENTOR
HERMENEGILDE P. CARRIER

BY Ralph L Chappell
ATTORNEY

Patented June 28, 1949

2,474,222

UNITED STATES PATENT OFFICE 2,474,222

SPLIT RING RETAINER EXTRACTOR

Hermenegilde P. Carrier, Charlestown, Mass.

Application May 15, 1945, Serial No. 593,904

3 Claims. (Cl. 29—229)

(Granted under the act of March 3, 1883, as amended April 30, 1928; 370 O. G. 757)

My invention relates to a split ring retainer extractor. It has to do, more particularly, with a tool which can be used to remove readily split rings which are used on shafts or similar members to retain various members in position thereon.

Split ring retainers are commonly used on the shafts of small electric motors to retain bearing members or other members in position thereon. Such split rings usually embrace the shaft and fit into a shallow annular groove surrounding the shaft. To remove these rings it is necessary to spread their ends apart slightly. These rings are very difficult to remove with the common tools, such as screw drivers and pliers. The rings are ordinarily so small and difficult to work with that it usually requires two persons to remove the ring. Furthermore, due to the difficulties of removing the ring with ordinary tools, there is constant danger of scoring and damaging the shaft or of bending the shaft which would result in interference with proper operation of the motor. Furthermore, there is danger of spreading the ring too much and thereby damaging it, or of losing the ring entirely.

The object of my invention is to provide a simple tool which may be used effectively to extract split ring retainers without danger of injury to the members which carry them or to the split rings and without danger of loss of such rings.

The preferred embodiment of my invention is illustrated in the accompanying drawings wherein similar characters of reference designate corresponding parts and wherein.

Figure 1:
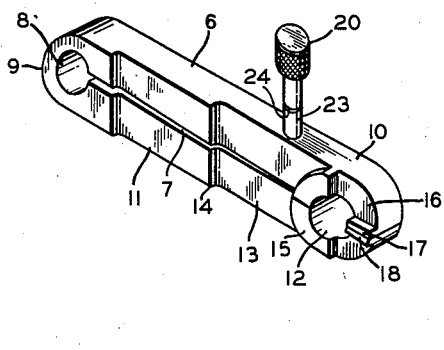
Fig. 1 is a perspective view of a tool made according to my invention.
Figure 2:
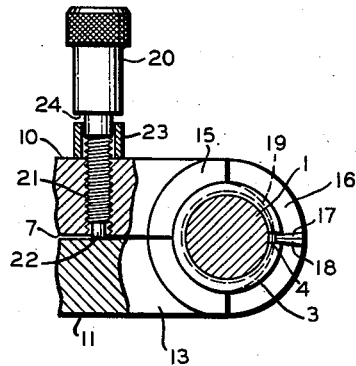
Fig. 2 is a bottom view, partly in section, of a portion of the tool shown in Fig. 1, the tool being shown in contracted condition around a shaft carrying a split ring.
Figure 3:
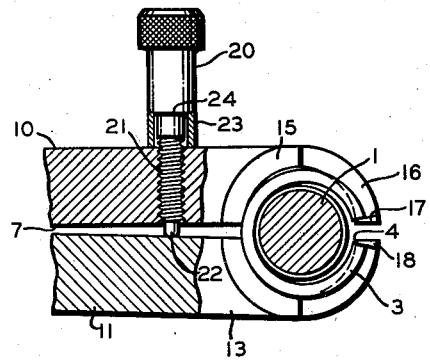
Fig. 3 is a view similar to Fig. 2 but showing the tool expanded.

With reference to the drawing I have illustrated in Figs. 1, 2, and 3 a tool made according to my invention.

Figure 4:
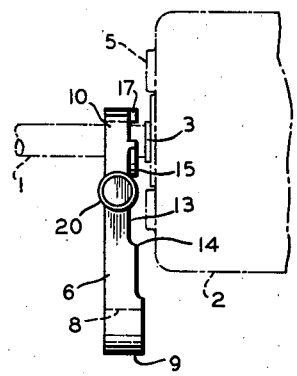
Fig. 4 is a diagrammatic view showing the tool being positioned on a shaft to remove a split ring therefrom.

In Fig. 4 I have illustrated the tool being positioned on the shaft 1 of a unit 2 which may be a small electric motor. A split ring retainer 3 is positioned in surrounding relationship to the shaft 1 and snaps into a shallow annular groove formed therein. The ends of this ring 3 will not contact with each other but there will be a space or split 4 formed therebetween, as shown in Fig. 2. A motor of the type indicated by the numeral 2 usually has an annular boss 5 on the end of its housing surrounding the shaft 1. The split ring 3 will maintain a bearing or other member in position on the shaft 1. The motor 2 is shown for illustrative purposes only and it is to be understood that my split ring retainer extractor may be used for removing split rings from other units.

My split ring retainer extractor comprises a handle member 6 which is preferably formed of metal. The handle is split longitudinally, as indicated at 7, from one end thereof to a point adjacent the other end thereof where a bore 8 is formed which extends entirely through the thickness thereof. Thus there is formed a flexible end 9 which serves as a spring hinge portion for the two arms 10 and 11 of the handle.

The split end of the handle 6 is provided with a bore 12 extending through the thickness thereof. One face of the handle 6 is provided with a recess 13 extending from a point 14, substantially midway between the ends thereof, to a point adjacent the bore 12 where a split ring embracing ledge 15 is formed. This ledge is of substantially semi-circular form and its inner surface is a continuation of the bore 12. The radius of curvature of this inner surface corresponds substantially to the radius of curvature of the outer surface of the retainer ring 3 to be removed.

The ledge 15 extends half-way around the bore 12 and substantially the remainder of the distance around the bore a retainer ring supporting shelf 16 is formed. This shelf 16 is interrupted by lugs 17 and 18 formed on the arms 10 and 11 of the handle member 6. The lugs 17 and 18 project from the surface 16 and extend from the bore 12 to the outer extremity of the handle 6. They normally abut each other and form a wedge-shape projection, as indicated in Fig. 2, which is designed to fit into the space or split 4 between the ends of the retainer ring. It will also be noted from Fig. 2 that the ring embracing surface of ledge 15 is semi-circular in form and, as previously stated, is a continuation of the corresponding side of the bore 12. However, it will further be noted that the opposite side of the bore 12 is not of semi-circular form but is of flattened or elliptical form, as indicated by the dotted lines 19 in Fig. 2. This arrangement is provided so that retainer ring 3 will be embraced by the inner surface of ledge 15 but will overlap the surface of the shelf 16.

To spread apart the arms 10 and 11 of the handle 6 when desired, I preferably provide a screw member 20. This member is threaded through a threaded opening 21 extending through the arm 10 adjacent its free end. The inner end 22 of the screw is blunt and engages the inner flat surface of the arm 11. A stop collar 23 is disposed on the screw between the outer surface of arm 10 and a shoulder 24 formed on the outer portion of the screw. By rotating the screw 20 in the proper direction, the end 22 will firmly engage arm 11 and, the force exerted by the flexible hinge portion 9 will be overcome so that as rotation of the screw is continued, the free ends of the arms 10 and 11 will be swung apart. Thus the lugs 17 and 18 will be moved away from each other. The spreading movement of the outer ends of the arms will be limited by contact of the shoulder 24 with the outer end of the sleeve 23, as shown in Fig. 3.

To remove the split retainer ring 3, the tool is slipped over the shaft 1, as shown in Fig. 4, with the shaft extending through the bore 12. At this time the screw 20 will be in the position indicated in Fig. 2 so that the free ends of the arms 10 and 11 will be in contact. The tool is moved axially of the shaft 1 until the abutting lugs 17 and 18 slip into the space 4 between the ends of the ring 3, and until the inner surface of ledge 15 embraces the outer surface of the ring 3 opposite the space 4. As previously indicated, the split side of the ring 3 will rest on the shelf 16.

To remove the ring 3, it is merely necessary to actuate screw 20 to move the lugs 17 and 18 apart and, thereby, spread the ends of the ring 3 apart. Spreading of the ends of the ring will be limited, due to the limited relative movement of arms 10 and 11. However, the ring will be spread sufficiently to move it out of the groove in which it normally seats and to permit it to be moved axially of the shaft 1. The tool is then merely slipped off the shaft and will carry the ring 3 with it. To reposition the ring on the shaft, it is merely necessary to reposition the tool, with the ring 3 carried thereby, on the shaft and then operate the screw 20 to release the ring. The recess 13 on the face of the handle 6 is provided to prevent interference of the handle 6 with the boss 5 on unit 2 which surrounds shaft 1.

It will be apparent from the above description that I have provided a tool which may be used effectively to remove split ring retainers from motor shafts or similar motors. The tool is of such a nature that the ring can be removed without damage or injury either to the ring or to the shaft which carries it. Furthermore, when the ring is removed it will be retained in the tool until it is to be repositioned on the shaft and, consequently, there will be no danger of losing it.

The invention described herein may be manufactured and used by or for the Government of the United States of America for Government purposes without the payment of any royalty thereon or therefor.

Having thus described my invention, what I claim is:

1. A split ring retainer extractor comprising a pair of operating arms normally bearing against each other, said arms being provided with an opening therebetween and adapting said extractor to be fitted over a member carrying a split ring retainer, an arcuate ledge supported upon each arm at one side of said opening and extending outwardly and axially thereof, said ledges providing an arcuate surface coextensive with the bounding surface of said opening and adapted to embrace and contact the outermost peripheral edge of said split ring retainer, and a lug supported upon each arm, said lugs extending outwardly and axially of said opening and substantially diametrically opposite said arcuate surface, said lugs being adapted to extend into the split of said split ring retainer when said arms bear against each other, said opening having a substantially semicircular cross section on the side of said ledges and a flattened elliptical cross section on the side of said lugs, thereby providing a shelf between each of said lugs and the adjacent ends of said ledges for contacting a portion of said split ring retainer.

2. Apparatus as in claim 1 wherein said operating arms are resiliently biased together, and means actuatable for overcoming said bias and spreading said arms.

3. A split ring retainer extractor comprising a handle member, said handle member being split from one extreme end to a point adjacent the other end to form flexibly connected arms that normally bear against each other, said arms being provided with an opening therebetween adapting said extractor to be fitted over a member carrying a split ring retainer, means for spreading said arms, ledges carried by said arms at one side of said opening and cooperating to form an arcuate surface adapted to embrace a portion of said split ring retainer, and a lug supported upon each arm, said lugs extending outwardly and axially of said opening and substantially diametrically opposite said arcuate surface, said lugs being adapted to extend into the split of said split ring retainer when said arms bear against each other, said opening having a substantially semicircular cross section on the side of said ledges and a flattened elliptical cross section on the side of said lugs.

HERMENEGILDE P. CARRIER.

REFERENCES CITED

The following references are of record in the file of this patent:

UNITED STATES PATENTS

| Number | Name | Date |
|---|---|---|
| 468,000 | Tomek | Feb. 2, 1892 |
| 1,368,446 | Madsen | Feb. 15, 1921 |
| 1,456,007 | Hartson et al. | May 22, 1923 |
| 1,536,601 | Anderson | May 5, 1925 |
| 1,711,573 | Matechik | May 7, 1929 |
| 1,764,146 | Bramberry | June 17, 1930 |
| 1,779,306 | Clark | Oct. 21, 1930 |
| 1,789,482 | Sunnen | Jan. 20, 1931 |
| 1,795,177 | Madsen | Mar. 3, 1931 |
| 1,861,973 | Mindermann et al. | June 7, 1932 |
| 2,166,089 | Brenner | July 11, 1939 |
| 2,201,091 | Hehir | May 14, 1940 |

FOREIGN PATENTS

| Number | Country | Date |
|---|---|---|
| 427,676 | Great Britain | Apr. 29, 1935 |